United States Patent [19]
McBride

[11] 3,846,929
[45] Nov. 12, 1974

[54] FISHING POLE HOLDER AND SIGNALING DEVICE

[76] Inventor: Jack C. McBride, Space No. 2, Deck Dr., Suisun City, Calif. 94585

[22] Filed: Aug. 17, 1973

[21] Appl. No.: 389,182

[52] U.S. Cl. .................................................. 43/17
[51] Int. Cl. .......................................... A01k 97/12
[58] Field of Search .................................. 43/17, 16

[56] References Cited
UNITED STATES PATENTS

| | | | |
|---|---|---|---|
| 2,618,090 | 11/1952 | Kimura | 43/15 |
| 2,817,176 | 12/1957 | Harshbarger | 43/17 |
| 3,780,466 | 12/1973 | Hadnot | 43/17 |

Primary Examiner—Robert Peshock
Assistant Examiner—Daniel I. Leach

[57] ABSTRACT

An adjustable and portable fishing pole holder having means for signaling a strike and/or nibble. The holder includes an elongated support element for the pole supported by two adjustable legs, a flat metal base, a signaling means mounted at the tip end of the support element, an eccentric mounted on the support element with a tension plate attached which may be adjusted at various degrees for different methods of fishing and for the stiffness of various fishing poles. On the support is a micro-switch which, when pressed, closes an electrical circuit. Closing of the electrical circuit, which occurs when a fish either strikes or nibbles, sounds a buzzer and simultaneously lights a light.

7 Claims, 6 Drawing Figures

PATENTED NOV 12 1974                3,846,929
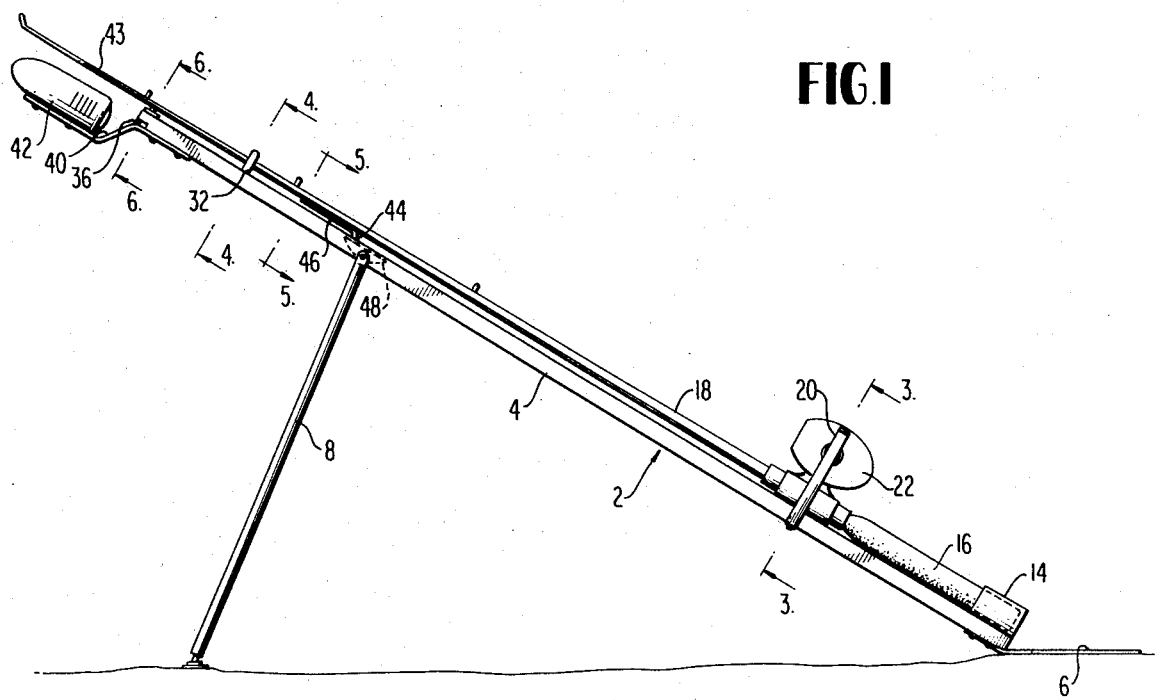
FIG.1
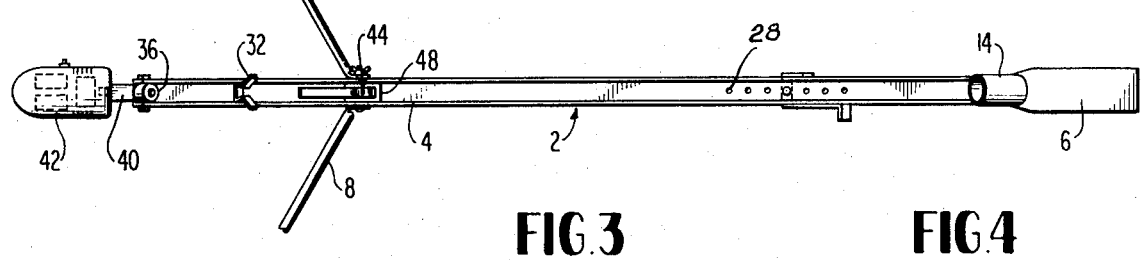
FIG.2
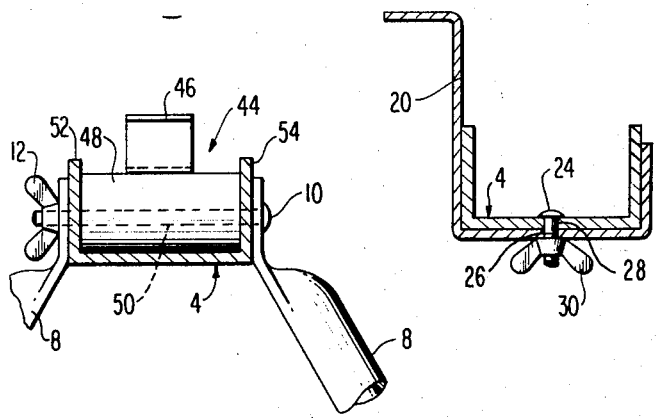
FIG.3        FIG.4
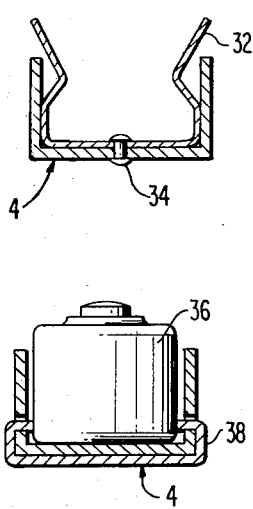
FIG.5
FIG.6

FISHING POLE HOLDER AND SIGNALING DEVICE

BACKGROUND OF THE INVENTION

1. Field of Invention

Fishing, Trapping and Vermin Destroying; Fishing, Signal devices.

2. Prior Art

Hartley U.S. Pat. No. 2,816,388; Kricksfeld et al. U.S. Pat. No. 3,228,135; Burns U.S. Pat. No. 3,389,489; Federline U.S. Pat. No. 3,670,443.

OBJECTS

Heretofore, there have been devised various fishing rod holders with signalling devices so that, when a fish bites, the rod or line closes against a switch to actuate a signal and thereby attract the attention of the fisherman. In most instances these rod holders are suitable for supporting a rod on a bank or beach, or on a dock or on a boat, but not all of them. One object now is to provide a generally triangular collapsible fishing rod holder that will support a fishing rod on virtually any kind of surface.

Perhaps the most important object of the invention is to provide a rod holder with a signalling device that can be accommodated to rods of various stiffness, and also to different methods of fishing which vary according to the type of fish being sought after, and the voracity of the fish at any given place or time. Where, as with the present invention, actuation of the alarm switch depends in substantial part upon the bending of the rod in response to a bite, it is important that the system be adjustable according to the stiffness of the rod, and also according to the type of fish and the fish's biting characteristics. For example, the fisherman might not desire to be notified by the alarm if a tiny "bait stealer" minnow nibbles at his bait. On the other hand, if he is fishing for river catfish who oftentimes first nibble lightly and toy with a bait before grabbing it, the fisherman may well desire to be notified immediately upon the slightest tug on his line. Also, the steady tension on the line may vary according to the weight of a sinker, or the current of the water. To this end the rod holder of the subject invention is adjustable so that the alarm can be set for actuation over a wide range of tensional forces on his line.

These and other objects will be apparent from the following specification and drawings, in which:

FIG. 1 is a side elevation of the rod holder and a rod supported thereon in a typical position of use;

FIG. 2 is a plan view of the rod and rod holder as shown in FIG. 1, absent the rod and reel;

FIG. 3 is a cross-section along the line 3—3 of FIG. 1, with the rod and reel removed;

FIG. 4 is a cross-section along the line 4—4 of FIG. 1 with the rod removed;

FIG. 5 is a cross-section along the line 5—5 of FIG. 1 with the rod removed; and, FIG. 6 is a cross-section along the line 6—6 with the rod removed.

Referring now to the drawings in which like reference numerals denote similar elements, the rod holder denoted generally at 2 is comprised of an elongate channel member 4 having riveted to one end thereof a ground engaging strip 6 and, towards the other end, a pair of folding legs 8 which normally extend downwardly and outwardly from the channel member 4 and which are pivotally supported by a clamp screw 10 and nut 12 so that they may be firmly held in extended position as shown in FIGS. 1 and 2, swung upwardly alongside channel member 4 for transportation, and they may be removed for packing. Riveted to channel member 4 adjacent ground engaging strip 6 is a closed-end socket 14 for receiving the butt end of a fishing rod 18. A brace 20 for the reel 22 is adjustable lengthwise of channel 4 by means of a clamp screw 24 which engages through a screw hole 26 on brace 20 and one of a series of holes 28 running lengthwise of channel 4. When adjusted to the desired position according to the position of reel 22 on rod 18, brace 20 may be tightened by clamp nut 30. Towards the left end of channel 4 as seen in FIGS. 1 and 2, there is a generally U-shape rod guide 32 held in channel 4 by a rivet 34, it being understood that the tip end portion of rod 18 has ample freedom of vertical movement in rod guide 32. At the left-hand end of channel 4 there is a micro-switch 36 suitably held in place as, for example, by a clamp strip 38. Extending beyond the left-hand end of channel 4 is a bracket 40 upon which is mounted an electric signal light and alarm buzzer 42, the signal light and alarm having therein a battery, not shown, and a conventional electrical connection, not shown, with the micro-switch 36, it being apparent that when the tip end 43 of the rod 18 is bent downwardly by the tug of a fish on the line, micro-switch 36 will be closed so as to light the signal light and sound the alarm buzzer. It is at this point that the utility of the adjustable tension device will be apparent, because fishing rods vary greatly in stiffness and length, and fish vary greatly in biting habits.

The adjustable tension member 44 consists of a spring strip 46 upon which rod 18 rests, and a rocker 48 upon which spring strip 46 is secured. Rocker 48 has a bore 50 through which clamp screw 10 extends so that it may be rotated so as to swing spring strip 46 upwardly or downwardly, and, having been thusly adjusted, rocker 48 is clamped in an adjusted position by tightening clamp nut 12 so as to force the sides 52 and 54 inwardly against rocker 48.

In operation, the rod holder 2 is set up with legs 8 extended, as shown in FIGS. 1 and 2, with rod 18 in place as shown, and the adjustable tension member 44 is set so as to obtain the desired sensitivity of alarm. When a fish bites with sufficient force to sound the alarm and light, the fisherman's attention is attracted so that he may quickly grasp the rod and remove it from the holder for playing the fish.

I claim:

1. A fishing rod holder and alarm, comprising
an elongate support member having means thereon for supporting a fishing rod with the tip-end portion of the rod disposed at one end of the support member and the butt-end portion of the rod disposed at the other end thereof,
means on said support member for holding the butt-end portion of the rod,
an electrical alarm system including a switch adjacent said one end of said support member, and means on said support member intermediate the ends thereof for adjustably supporting an intermediate portion of said rod at a selected distance away from said support member, whereby selectively to vary the force required to be applied to the tip end thereof to actuate said switch.

2. A fishing rod holder and alarm as claimed in claim 1,
the means for adjustably supporting an intermediate portion of said rod comprising a rocker member,
means mounting said rocker member for rotation about an axis transverse to the length of the support member,
means on said rocker member for engaging against said rod,
and means for holding said rocker member in selected rotational position.

3. A fishing rod holder and alarm as claimed in claim 2, the means on said rocker member for engaging against said rod comprising a spring arm having one end affixed to said rocker member and the other end extending away from said rocker member in the longitudinal direction of said support member.

4. A fishing rod holder and alarm as claimed in claim 1, said elongate support member comprising an elongate upwardly open channel, the means for holding the butt end of a rod comprising a closed-end socket secured in said channel.

5. A fishing rod holder and alarm as claimed in claim 4, and a pair of legs pivoted on opposite sides of said channel intermediate the ends thereof.

6. A fishing rod holder and alarm as claimed in claim 5, and a ground-engaging foot strip secured to the bottom of said channel and extending in the longitudinal direction of said channel beyond said other end thereof.

7. A fishing rod holder and alarm as claimed in claim 1, a brace for a reel on said rod, and means adjustably mounting said brace on said support for adjustment lengthwise therealong.

* * * * *